United States Patent
Krestan et al.

[15] 3,688,871
[45] Sept. 5, 1972

[54] OIL PAN FOR A MULTI-CYLINDER RECIPROCATING PISTON INTERNAL COMBUSTION ENGINE

[72] Inventors: Rudolf Krestan, Stuttgart-Rotenberg; Kurt Kenngott, Stuttgart-Feuerbach, both of Germany

[73] Assignee: Daimler-Benz Aktiengesellschaft, Stuttgart, Germany

[22] Filed: July 7, 1970

[21] Appl. No.: 52,831

[30] Foreign Application Priority Data

July 18, 1970    Germany..........P 19 36 572.1

[52] U.S. Cl.................................184/6.5, 184/106
[51] Int. Cl.............................................F01m 11/00
[58] Field of Search..............184/6.2, 6.5, 6.13, 106; 123/198 E

[56] References Cited
UNITED STATES PATENTS

| | | | |
|---|---|---|---|
| 3,189,126 | 6/1965 | May | 184/6.2 |
| 3,101,129 | 8/1963 | Hulten | 184/106 |
| 2,577,188 | 12/1951 | Hall | 184/106 |

FOREIGN PATENTS OR APPLICATIONS

| | | | |
|---|---|---|---|
| 1,102,169 | 5/1955 | France | 184/106 |
| 675,502 | 7/1952 | Great Britain | 184/106 |

*Primary Examiner*—Manuel A. Antonakas
*Attorney*—Craig & Antonelli

[57] ABSTRACT

An oil pan for a multi-cylinder reciprocating piston internal combustion engine which includes a bottom part disposed near the drive mechanism of the engine and a relatively deep part for the oil sump at one end and in which the bottom part is provided with ribs guiding the lubricating oil into the oil sump.

12 Claims, 3 Drawing Figures

OIL PAN FOR A MULTI-CYLINDER RECIPROCATING PISTON INTERNAL COMBUSTION ENGINE

The present invention relates to an oil pan of a multi-cylinder reciprocating piston internal combustion engine which includes a bottom part disposed near the power plant of the internal combustion engine and a relatively deep part for the oil sump at one end.

In line with the general aim to reduce the structural height of motor vehicles, especially the structural height of the vehicle front section accommodating the driving internal combustion engine, one has gone over to keep small the over-all constructive height of the internal combustion engine, inter alia, also in that the distance of the bottom part of the oil pan relative to the rotating parts of the motor has been decreased. It is disadvantageous in this construction that the rotating motor parts immerge constantly into the oil flowing off from the bottom part of the oil pan into the oil sump. As a result thereof, larger quantities of oil are torn along in the upward direction and the oil drainage into the sump is delayed. An oil vortex or eddy forms in the bottom part of the oil pan which moves only slowly in the discharge direction. The consequence thereof is an increased drag power of the internal combustion engine, the oil temperature rises, and the oil quantity in the oil sump is reduced. A reduction of the oil quantity in the oil sump may lead to bearing damages if the oil pump, for example, during a curve drive, draws in air.

The present invention is therefore concerned with the task to eliminate the aforementioned disadvantages. The underlying problems are solved according to the present invention in that ribs conducting the lubricating oil into the oil sump are arranged in the bottom part of the oil pan.

The rotating oil vortex or eddy is intersected by the arrangement of the ribs in the bottom part. The oil can flow off more rapidly in the direction toward the oil sump. As a result thereof, only smaller oil quantities can be taken along by the rotating drive mechanism parts. As a consequence thereof, a gain in effective power is achieved. The oil temperature decreases. The oil becomes calm more rapidly and frees itself more rapidly of air particles. Additionally, the quietness of the running of the internal combustion engine increases. Since the oil level in the oil sump is improved, the oil sump does not need to be designed particularly deep which is advantageous as regards the road clearance of the vehicle. The manufacture of the oil pan with ribs poses no problems. It can be realized, as usual, of die-cast metal, for instance, by pressure-casting.

In an advantageous construction of the present invention, the ribs may be higher than the interior spacing between the bottom part and the rotating motor parts and the ribs may thereby be recessed within the area of the rotating engine parts and within the area of the engine bearings. A formation of a rotating oil vortex or eddy is made practically impossible thereby.

On the side of the bottom part, toward which is directed the e movement of the rotating engine parts, several ribs extending parallel to one another may be provided which extend from the lateral boundary of the bottom part up to approximately the center of the bottom part preferably arcuately shaped in the direction of the part of the oil pan accommodating the oil sump.

On the opposite side of the bottom part may be arranged a rib extending nearly over the entire length of the bottom part which is at a greater distance from the lateral boundary of the bottom part within the area of the part of the oil pan accommodating the oil sump than at the other end. However, also several ribs extending obliquely to the longitudinal axis of the oil pan may be arranged on this side.

Accordingly, it is an object of the present invention to provide an oil pan for multi-cylinder internal combustion engines which avoids by simple means the aforementioned shortcomings and drawbacks encountered in the prior art.

Another object of the present invention resides in an oil pan for multi-cylinder reciprocating piston internal combustion engines which assures rapid return flow of the oil into the oil sump while effectively precluding the formation of an oil vortex in the bottom part of the oil pan.

A further object of the present invention resides in an oil pan which effectively produces an increased output of the engine by reducing the drag on the engine while at the same time assuring adequate lubrication under all driving conditions.

Still another object of the present invention resides in an oil pan which brings about a more quiet and steady operation of the internal combustion engine and which permits minimum road clearance of the vehicle.

These and other objects, features, and advantages of the present invention will become more obvious from the following description when taken in connection with the accompanying drawing which shows, for purposes of illustration only, one embodiment in accordance with the present invention, and wherein.

Figure 1:
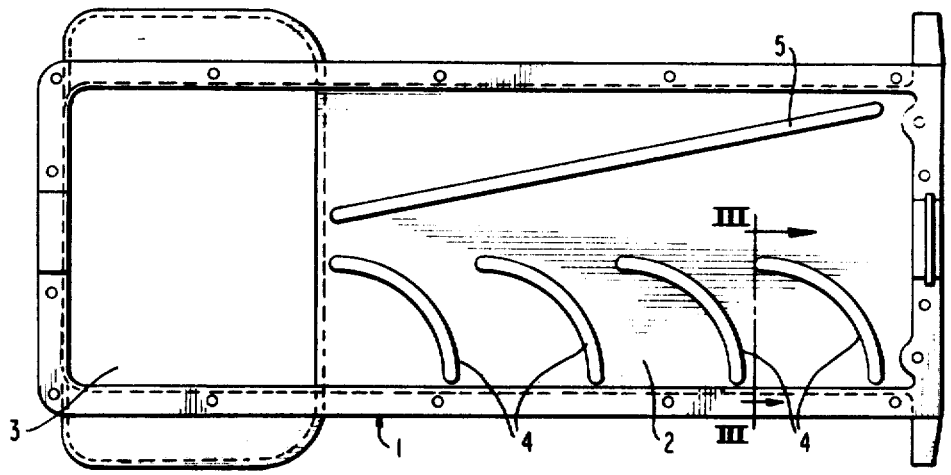
FIG. 1 is a top plan view on an oil pan in accordance with the present invention.
Figure 2:
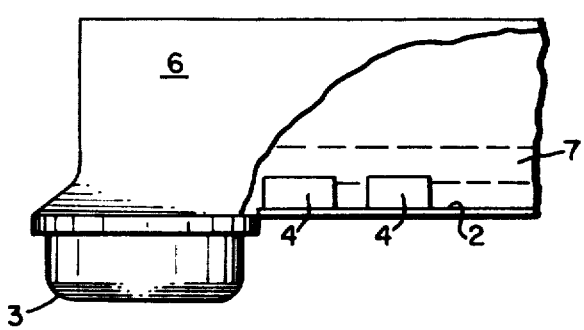
FIG. 2 is a side schematic partially cut-away view of the oil pan arranged on an engine.
Figure 3:
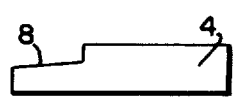
FIG. 3 is a frontal side view of one of the ribs schematically illustrating recess means thereon.

Referring now to the drawings, reference numeral 1 generally designates therein the oil pan which includes a bottom part 2 and a relatively deep part 3 accommodating the oil sump. Ribs 4 and 5 are arranged in the bottom part 2 in order to guide the oil which drips down from the lubricating places of the internal combustion engine into the bottom part 2 of the oil pan 1, rapidly into the oil sump in the part 3. The ribs 4 are disposed on the side of the bottom part 2, toward which is directed the movement of the rotating parts of the motor 6. The ribs 4 extend in the shape of an arc from the lateral boundary of the bottom part 2 up to approximately the center of the bottom part in the direction toward the part 3 of the oil pan accommodating the oil sump whereby all ribs 4 are disposed parallel to one another. On the opposite side of the bottom part 2 is arranged the rib 5. The latter extends nearly over the entire length of the bottom part 2 and is located at an inclination in such a manner that within the area of the part 3 the distance from the associated lateral boundary of the bottom part 2 to the rib 5 is larger than at the other end of the rib 5. The ribs 4 and 5 may be provided with recesses (shown schematically at 8 in FIG. 3) for rotating engine parts and engine bearings, which parts and bearings are shown schematically at 7 in FIG. 2.

While we have shown and described only one embodiment in accordance with the present invention, it is understood that the same is not limited thereto but is susceptible of numerous changes and modifications as known to those skilled in the art. For example, instead of one rib 5, also several such ribs may be provided which extend at an angle to the longitudinal axis of the oil pan. Thus, it is obvious that the present invention is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An oil pan for accommodating oil for an engine, comprising: a deep part forming an oil sump, a relatively shallow part communicating with said sump, and rib means projecting upwardly from the bottom of said shallow part for guiding the lubricating oil into the sump, said rib means including recesses along parts of the upper portions thereof for accommodating other engine structure, characterized in that said rib means includes several first rib structures provided on one side of the bottom of the shallow part, said first rib structures extending from a lateral boundary of the shallow part approximately up to the center of the shallow part, portions of said rib structures adjacent the lateral boundary being spaced farther from the oil sump than portions of said rib structures adjacent the center of the shallow part.

2. An oil pan according to claim 1, characterized in that all of said rib structures are substantially parallel to one another.

3. An oil pan according to claim 2, characterized in that said parallel first rib structures are of substantially arcuate shape.

4. An oil pan according to claim 3, characterized in that at least one second rib structure is arranged on the opposite side of the shallow part from the first rib structures, said second rib structure extending nearly over the entire length of said shallow part, said second rib structure being spaced within the area of the part of the oil pan accommodating the oil sump, a greater distance from a lateral boundary of the shallow part than at the other end.

5. An oil pan according to claim 4, characterized in that several rib means are arranged on the opposite side of the shallow part which extend at an inclination to the longitudinal axis of the oil pan.

6. An oil pan and engine arrangement for accommodating lubricating oil, comprising an engine, a deep part of an oil pan forming an oil sump, a relatively shallow part of said oil pan communicating with said sump, said shallow part being disposed near a drive mechanism of the engine such that rotating drive mechanism parts of said drive mechanism and drive mechanism bearings of said drive mechanism extend downwardly into said shallow part, and rib means projecting upwardly from the bottom of said shallow part for guiding the lubricating oil into the sump, said rib means including means for permitting the downward extension of said drive mechanism parts and said drive mechanism bearings below the upper portions of said rib means.

7. An arrangement according to claim 6, wherein said last mentioned means includes a longitudinally extending open space between ribs of the rib means.

8. An arrangement according to claim 6, wherein said last mentioned means includes recess means in upper portions of said rib means.

9. An arrangement according to claim 6, characterized in that said rib means includes several first rib structures provided on one side of the bottom of the shallow part, the movement of the rotating drive mechanism parts being directed toward said one side, said first rib structures extending from a lateral boundary of the shallow part approximately up to the center of the shallow part, portions of said rib structures adjacent the lateral boundary being spaced farther from the oil sump than portions of said rib structures adjacent the center of the shallow part.

10. An arrangement according to claim 9, characterized in that all of said first rib structures are substantially parallel to one another.

11. An arrangement according to claim 10, characterized in that said parallel rib means are of substantially arcuate shape.

12. An arrangement according to claim 9, characterized in that at least one second rib structure is arranged on the opposite side of the shallow part from the first rib structures, said second rib structure extending nearly over the entire length of said shallow part, said second rib structure being spaced within the area of the part of the oil pan accommodating the oil sump, a greater distance from a lateral boundary of the shallow part than at the other end.

* * * * *